United States Patent
French et al.

(10) Patent No.: US 9,714,609 B2
(45) Date of Patent: Jul. 25, 2017

(54) GAS TURBINE ENGINE AND ELECTRIC MACHINE

(71) Applicant: Rolls-Royce North American Technologies, Inc.

(72) Inventors: Mat French, Avon, IN (US); William L. Siegel, Woodbridge, VA (US); Mark J. Blackwelder, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 17 days.

(21) Appl. No.: 14/461,721

(22) Filed: Aug. 18, 2014

(65) Prior Publication Data

US 2014/0356135 A1    Dec. 4, 2014

Related U.S. Application Data

(63) Continuation of application No. PCT/US2013/026588, filed on Feb. 18, 2013.
(Continued)

(51) Int. Cl.
*F02C 6/04* (2006.01)
*F01D 15/10* (2006.01)
(Continued)

(52) U.S. Cl.
CPC .............. *F02C 6/04* (2013.01); *F01D 15/10* (2013.01); *H02K 7/1823* (2013.01);
(Continued)

(58) Field of Classification Search
CPC . F02C 7/266; F02C 6/04; F01D 15/10; H02K 7/1823; H02K 21/028;
(Continued)

(56) References Cited

U.S. PATENT DOCUMENTS 4,367,413 A    1/1983   Nair
4,720,640 A    1/1988   Anderson et al.
(Continued)

OTHER PUBLICATIONS

International Search Report and Written Opinion, PCT/US2013/026588, Rolls-Royce North American Technoogies, Inc., Jun. 28, 2013.
(Continued)

*Primary Examiner* — Viet Nguyen
(74) *Attorney, Agent, or Firm* — Shumaker & Sieffert, P.A.

(57) ABSTRACT

An electric machine is disclosed integrated to rotate with a shaft of a gas turbine engine. In one form the electric machine is integrated with a fan of the gas turbine engine. A rotor of the electric machine can be disposed at the end of the fan blades and the stator integrated into a flow path forming surface of the gas turbine engine. In one form the windings of the electric machine can change configuration permitting some windings to be placed in parallel with one or more other windings, and then connected together in series with remaining windings, if any. The voltage of the electric machine can change as a result of a change in configuration of the windings. A moveable member can also be used to alter a magnetic field produced from the electric machine when operated such that a voltage can be changed as a result of altering the magnetic field.

15 Claims, 4 Drawing Sheets

Related U.S. Application Data

(60) Provisional application No. 61/599,860, filed on Feb. 16, 2012.

(51) Int. Cl.
  *H02K 21/02* (2006.01)
  *H02K 7/18* (2006.01)
  *F02C 7/266* (2006.01)
  *H02K 3/28* (2006.01)

(52) U.S. Cl.
  CPC ............ *H02K 21/028* (2013.01); *F02C 7/266* (2013.01); *F05D 2220/36* (2013.01); *F05D 2220/76* (2013.01); *F05D 2270/304* (2013.01); *H02K 3/28* (2013.01); *H02K 2213/09* (2013.01)

(58) Field of Classification Search
  CPC ............... H02K 21/024; H02K 21/023; H02K 2213/09; H02K 3/28
  USPC .................................... 290/1 A, 52
  See application file for complete search history.

(56) References Cited

U.S. PATENT DOCUMENTS

| | | | |
|---|---|---|---|
| 6,064,123 A * | 5/2000 | Gislason | F03D 9/002 290/44 |
| 6,729,140 B2 * | 5/2004 | Care | F01D 5/14 290/52 |
| 6,832,486 B2 | 12/2004 | Care et al. | |
| 7,603,864 B2 | 10/2009 | Gemin et al. | |
| 7,721,555 B2 | 5/2010 | Sharp et al. | |
| 2002/0117927 A1 | 8/2002 | Kim et al. | |
| 2002/0145288 A1 * | 10/2002 | Van Breems | F03B 13/1845 290/42 |
| 2007/0024220 A1 * | 2/2007 | Shirazee | H02K 3/28 318/400.41 |
| 2008/0116759 A1 * | 5/2008 | Lin | H02K 3/28 310/184 |
| 2008/0120980 A1 * | 5/2008 | Gemin | F01D 15/10 60/802 |
| 2008/0265580 A1 * | 10/2008 | Sharp | F01D 15/10 290/52 |
| 2010/0014960 A1 | 1/2010 | Lee | |
| 2010/0127496 A1 | 5/2010 | Burkholder et al. | |
| 2011/0000206 A1 * | 1/2011 | Aprad | F02G 1/043 60/517 |
| 2011/0187110 A1 * | 8/2011 | Presz, Jr. | F01D 9/04 290/52 |
| 2012/0126740 A1 * | 5/2012 | Kauppi | H02K 21/028 318/538 |
| 2013/0168964 A1 * | 7/2013 | Xu | F01K 23/04 290/52 |

OTHER PUBLICATIONS

Extended Search Report from counterpart European Application No. 13749687.3, dated May 9, 2017, 12 pp.

\* cited by examiner

GAS TURBINE ENGINE AND ELECTRIC MACHINE

CROSS REFERENCE TO RELATED APPLICATIONS

The present application claims the benefit of U.S. Provisional Patent Application 61/599,860, filed Feb. 16, 2012, and is incorporated herein by reference.

TECHNICAL FIELD

The present invention generally relates to electric machines used with gas turbine engines, and more particularly, but not exclusively, to electric machines integrated with gas turbine engines.

BACKGROUND

Providing electric machines that can be used with gas turbine engines remains an area of interest. Some existing systems have various shortcomings relative to certain applications. Accordingly, there remains a need for further contributions in this area of technology.

SUMMARY

One embodiment of the present invention is a unique gas turbine engine and electric machine. Other embodiments include apparatuses, systems, devices, hardware, methods, and combinations for providing electric power from gas turbine engine operation. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
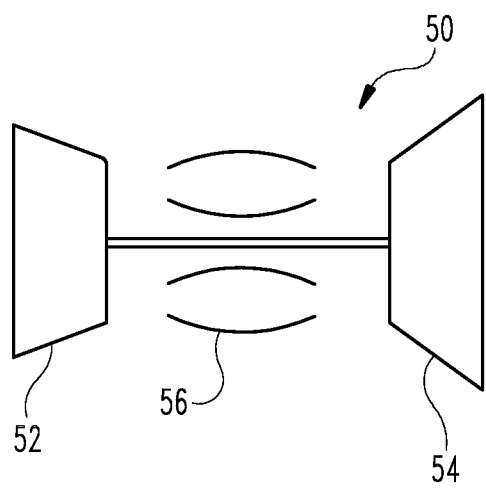
FIG. 1 is an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having turbomachinery components such as a compressor 52 and turbine 54, as well as a combustor 56. The turbomachinery components can include one or more rotating rows of blades and additionally can include one or more rows of vanes, whether static or variable. A shaft can be used in/with the gas turbine engine 50 and be configured to rotate at the same rate with one or more of the turbomachinery components. In the illustrated embodiment the shaft extends axially to connect the compressor 52 with the turbine 54, but other configurations are also contemplated herein. The gas turbine engine 50 is depicted as a turbojet engine in the illustrated embodiment but can take on other forms such as a turboshaft, turboprop, and turbofan in other embodiments. As such, the gas turbine engine 50 can have any number of spools and take on any variety of forms. Additionally, the gas turbine engine can be configured as an adaptive cycle and/or variable cycle engine. In some forms the gas turbine engine can be used to provide power, such as propulsive power in one non-limiting embodiment, to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2A:
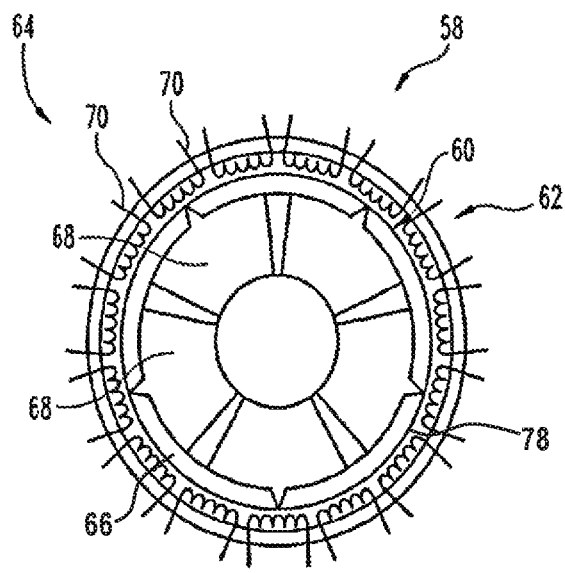
FIG. 2A is an embodiment of an electric machine integrated with a gas turbine engine.
Figure 2B:
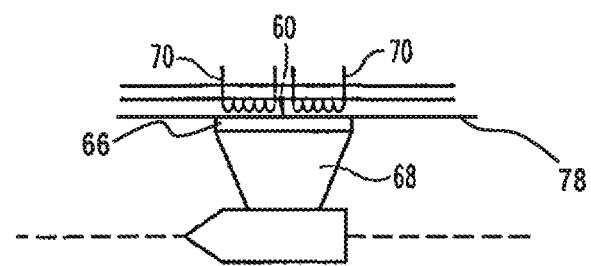
FIG. 2B is an embodiment of an electric machine integrated with a gas turbine engine.

Turning now to FIGS. 2A and 2B, one embodiment is depicted of an electric machine 58 coupled with the gas turbine engine 50 and having a rotor 60 that rotates at the same rate as a shaft of the gas turbine engine 50. The gas turbine engine 50 includes a surface 78 defining a flow path boundary radially outward of plurality of blades 68. The electric machine 58 also includes a stator 62 which interacts with the rotor 60 during operation of the electric machine. In one non-limiting form the electric machine 58 is capable of generating electricity by relative rotation of the rotor 60 and stator 62. The embodiment of the electric machine 58 depicted in the illustrated embodiment is integrated with a fan 64 of the gas turbine engine 50, where the engine 50 is in the form of a turbofan. In other embodiments the electric machine 58 can be integrated to rotate with another shaft and/or another turbomachinery component.

The rotor 60 of the illustrated embodiment includes a magnetic field element 66 integrated with blades 68 of the turbomachinery component. In one non-limiting form the magnetic field element 66 can take the form of a permanent magnet. The magnetic field element 66 is disposed at the end of the blades 68 but can take different positions in other embodiments. Any number of magnetic field elements 66 can be used.

The stator 62 of the illustrated embodiment includes a number of coils 70 distributed around the annulus of the turbomachinery component. Each of the coils can include any number of windings. In addition, any number of coils having any variety of winding configurations can be used. Though the coils 70 are depicted as protruding into a flow stream between a casing and the blades 68, it will be appreciated that in some embodiments the coils 70 are protected from the flow stream by a material covering 82. Such material covering 82 can take a variety of forms, and in one non-limiting embodiment is material made from para-aramid synthetic fiber such as KEVLAR. Such a fiber could be woven together in a fabric or embedded in a matrix. Any variety of other material coverings are also contemplated herein.

In one mode of operation the electric machine 58 can generate an electromotive force according to the relation: $\epsilon = NBA\omega(\sin \omega t)$ where N is the number of windings on the coils, B is the magnetic field, A is the area of coil perpendicular to the magnetic field, and $\omega$ is the relative rotational speed between the rotor 60 and stator 62. As will be described herein below, some embodiments of the instant application are capable of adjusting voltage as a function of relative rotational speed by adjusting one or more of the other variables of the relationship, such as but not limited to the magnetic field and/or the number of windings on the coils.

Figure 3D:
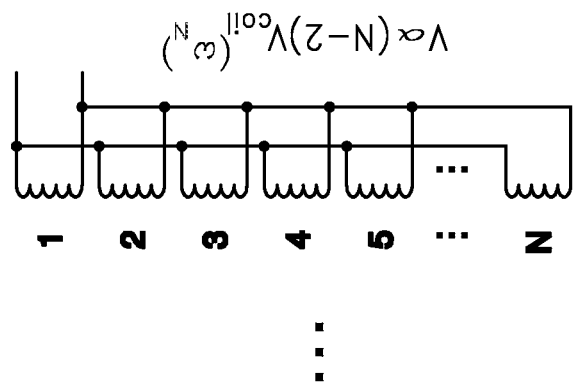
FIG. 3D is a configuration of windings of an electric machine.
Figure 3C:
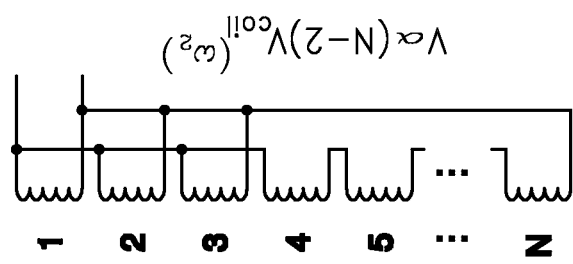
FIG. 3C is a configuration of windings of an electric machine.
Figure 3B:
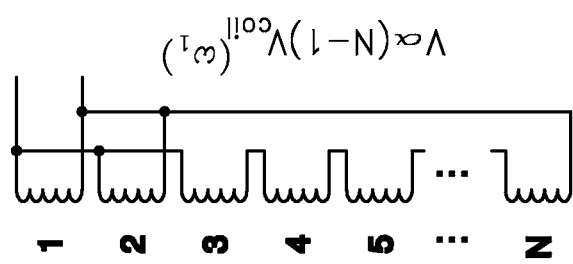
FIG. 3B is a configuration of windings of an electric machine.
Figure 3A:
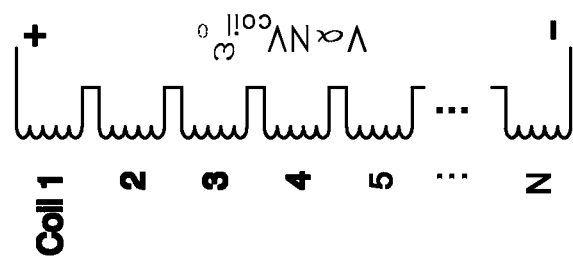
FIG. 3A is a configuration of windings of an electric machine.

Turning now to FIGS. 3A-3D, a series of diagrams depicting various configurations of the windings in a coil is illustrated. The windings can be arranged in a variety of configurations during operation of the gas turbine engine. For example, during one mode of operation the windings can all be placed in series together as is depicted in FIG. 3A. In another mode of operation some of the windings can be placed in parallel with one other to create a parallel subset of windings, while the remaining windings are placed in series with each other and in series with the parallel subset of windings. FIG. 3B depicts one configuration in which the top two windings have been placed in parallel with each other, and then coupled in series with the remaining windings that are also coupled to each other in series. The voltage in this configuration is proportional to $(N-1)V_{coil}(\omega_1)$ where N is the number of windings and $\omega_1$ is the relative rotational speed between the stator and the rotor. FIG. 3C depicts an additional winding placed in parallel with the windings that were placed in parallel in FIG. 3B, thus creating three windings in parallel, which are together placed in series with the remaining windings. The voltage of this configuration is proportional to $(N-1)V_{coil}(\omega_1)$. FIG. 3D depicts all windings placed in parallel with each other. The voltage of this configuration is proportional to $V_{coil}(\omega_N)$.

Figure 4:
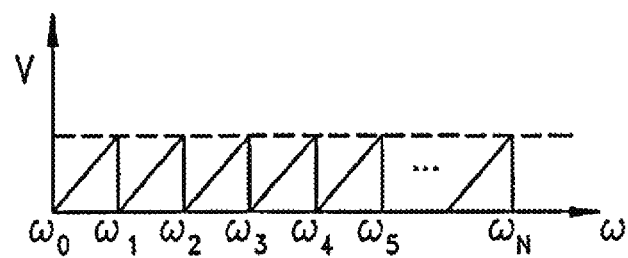
FIG. 4 depicts a chart of voltage change as a function of relative rotational speed.

FIG. 4 depicts an embodiment where voltage provided from the electric machine 58 can be regulated as a function of relative rotational speed. As rotational speed approaches $\omega_1$ all windings can be configured in series relative to each other. At or near $\omega_1$ the windings can be placed in the configuration depicted in FIG. 3B which drops the voltage produced toward the x-axis depicted in the figure. As relative rotational speed increases the voltage produced by the electric machine 58 also increases. At or near $\omega_2$ the windings can be placed in the configuration depicted in FIG. 3C which drops the voltage produced toward the x-axis depicted in the figure. This process can be repeated until all windings have been placed in parallel as shown in FIG. 3D. The number of windings can be chosen to accommodate a wide range of relative rotational speeds of the rotor 60 and stator 62.

The configuration of the windings can be provided as described above in FIGS. 3A-4 using any variety of manner of techniques. In one non-limiting embodiment the coils are placed in a given configuration using one or more mechanical switches as will be appreciated by those in the art.

Figure 5A:
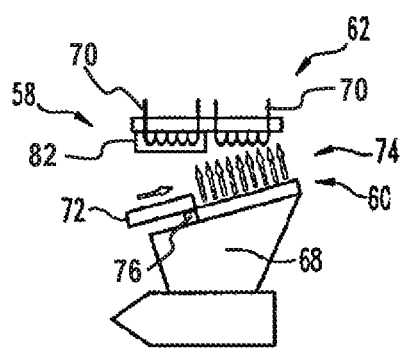
FIG. 5A is an embodiment of an electric machine having a moveable member.
Figure 5B:
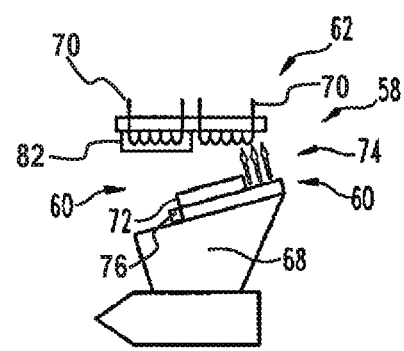
FIG. 5B is an embodiment of an electric machine having a moveable member.

Turning now to FIGS. 5A and 5B, one embodiment is depicted of a moveable member 72 capable of altering a magnetic field 74 utilized during operation of the electric machine 58. The moveable member 72 can be a slip ring and in some forms can include a portion made of steel. In the illustrated embodiment the moveable member 72 is shown coupled with the rotor 60 and is capable of being moved from the position depicted in FIG. 5A to the position depicted in FIG. 5B to reduce a magnetic field produced by the rotor 60. In some examples, a biasing member 76 may provide a force to the moveable member 72. Such a reduction can be provided as a function of relative rotational speed between the rotor 60 and the stator 62. For example, the moveable member 72 can occupy the position shown in FIG. 5A at relatively low rotational speed of the rotor 60, but can be moved to the position depicted in FIG. 5B at relatively high rotational speed of the rotor 60. The fan blades 68 can be constructed such that a small angle would be present allowing for a conical shape, similar to that depicted in FIGS. 5A and 5B.

In some forms the moveable member 72 can be coupled with a device that provides a force to oppose motion of the moveable member 72. For example, a spring or other type of energy member can be used to resist movement of the moveable member 72. When rotated at low speed the energy member can be used to withdraw the moveable member from the magnetic field to provide relatively large magnetic field to produce a voltage from the electric machine 58. When rotated at high speed the force imparted to the moveable member 72 can be sufficiently large relative to the energy member such as to place the moveable member 72 in position shown in FIG. 5B to produce relatively low magnetic field. In this way the magnetic field is changed as a function of relative speed of the rotor 60 and stator 62. In one non-limiting embodiment the moveable member 72 can change position as a function of rotational speed such that voltage produced by the electric machine 58 when operated as a generator can be regulated to a desired level such as either a specific value or a desired range.

The moveable member 72 can be positioned in a location other than that depicted in FIGS. 5A and 5B to influence the magnetic field provided during operation of the electric machine 58. For example, the moveable member 72 can be located with or in proximity to the stator to change the magnetic field during rotation of the rotor. In one non-limiting form the moveable member 72 can be in sliding arrangement with the coils and/or the material covering and as such would be static relative to the rotor 60. The moveable member 72 could be moved between positions using any variety of devices such as an actuator.

Any of the embodiments discussed above can stand alone or be combined with any one or more of the other embodiments. To set forth just a few non-limiting examples: (1) any of the embodiments of FIGS. 2A and 2B alone; (2) any of the embodiments of FIGS. 3A-3D alone; (3) any of the embodiments of FIGS. 5A and 5B alone; (4) any of the embodiments of FIGS. 2A and 2B combined with any of the embodiments of FIGS. 3A-3D; (5) any of the embodiments of FIGS. 2A and 2B combined with any of the embodiments of FIGS. 5A and 5B; (6) any of the embodiments of FIGS. 2A and 2B combined with any of the embodiments of FIGS. 3A-3D combined with any of the embodiments of FIGS. 5A and 5B; and (7) any of the embodiments of FIGS. 3A-3D combined with any of the embodiments of FIGS. 5A and 5B.

In some applications a sensor can be used to detect one or more variables such as relative rotational speed between the rotor 60 and stator 62 to adjust a voltage provided by the electric machine 58 when operated as a generator. Other sensors can additionally and/or alternatively be used to assess one or more conditions useful to adjust voltage. For example, a sensor that assesses position of the moveable member 72 can be used.

Information from the sensor can be incorporated with a controller in some embodiments useful to adjust voltage of the electric machine 58. Such a controller can be comprised of digital circuitry, analog circuitry, or a hybrid combination of both of these types. Also, the controller can be programmable, an integrated state machine, or a hybrid combination thereof. The controller can include one or more Arithmetic Logic Units (ALUs), Central Processing Units (CPUs), memories, limiters, conditioners, filters, format converters, or the like which are not shown to preserve clarity. In one form, the controller is of a programmable variety that executes algorithms and processes data in accordance with operating logic that is defined by programming instructions (such as software or firmware). Alternatively or additionally, operating logic for the controller can be at least partially defined by hardwired logic or other hardware. In one particular form, the controller is configured to operate as a Full Authority Digital Engine Control (FADEC); however, in other embodiments it may be organized/configured in a different manner as would occur to those skilled in the art.

In one aspect the present application provides an apparatus comprising a gas turbine engine having an electrical machine that includes a stator portion and rotor portion configured to interact and produce electrical power when rotated, the electrical machine integrated with a rotatable turbomachinery component of the gas turbine engine having a plurality of blades and a surface forming a flow path boundary radially outward of the plurality of blades, the rotor portion extending between blades of the rotatable turbomachinery component and located radially inward from the flow path boundary.

One feature of the present application provides wherein the gas turbine engine is a turbofan, and the bladed rotor is a bladed fan component of the turbofan engine.

Another feature of the present application provides wherein the rotor portion located radially inward from the flow path boundary forms a bridge between blades of the rotatable turbomachinery component.

Still another feature of the present application provides wherein the bridge forms an annular construction around the entirety of the plurality of blades.

Yet still another feature of the present application provides wherein conductive coils of the electrical machine are located radially outward from the surface forming the flow path boundary such that the conductive coils are protected from a working fluid that flows through the turbomachinery component.

Still yet another feature of the present application further includes a voltage adjuster.

A further feature of the present application further includes a magnetic field adjuster.

Another aspect of the present application provides an apparatus comprising a gas turbine engine including a bladed turbomachinery component structured to rotate through an annulus and change a pressure of a working fluid flowing through the annulus, the gas turbine engine also having an electric machine that includes a rotor structured to rotate at the same speed as the bladed turbomachinery component of the gas turbine engine and a stator, the electric machine having a plurality of windings coupled with a voltage adjuster structured to interconnect the plurality of windings in a plurality of configurations, wherein the voltage adjuster includes a selector member capable of arranging one or more of the plurality of windings in parallel to create a parallel winding configuration, the remaining of the plurality of windings placed in series with each other and the parallel winding configuration.

A feature of the present application provides wherein the selector member includes a plurality of switches, and wherein the electric machine includes a plurality of coils each having the plurality of windings.

Another feature of the present application provides wherein the electric machine is an electric generator.

Still another feature of the present application provides wherein the rotor is disposed at a radially outer end of the bladed turbomachinery component.

Yet still another feature of the present application provides wherein the rotor is radially inward of a surface forming a flow path of the gas turbine engine.

Still yet another feature of the present application provides wherein the gas turbine engine includes a fan and a bypass duct, and wherein the bladed turbomachinery component is the fan.

A further feature of the present application further includes magnetic field adjuster.

Still another aspect of the present application provides an apparatus comprising a gas turbine engine having a shaft drivingly connected to a row of blades structured to rotate within a passage and change a total pressure of a working fluid traversing the passage, the gas turbine engine also including an electric machine having a first component with coils and a second component having a moveable member capable of altering a magnetic field that interacts with the coils of the first component, the first and second components configured to rotate relative to one another at substantially the same rate as the shaft of the gas turbine engine, and wherein the moveable component is structured to alter the magnetic field as a function of rotational speed of the shaft.

A feature of the present application provides wherein the moveable component is urged from a first position to a second position via centripetal acceleration.

Another feature of the present application provides wherein the moveable component is slideable from the first position to the second position.

Still another feature of the present application further includes a biasing member that provides a force to the moveable component when it is in the second position.

Yet still another feature of the present application provides wherein the second component is a rotor of the electric machine, the rotor located radially inward of a flow path forming surface of the gas turbine engine.

A further feature of the present application provides wherein the second component includes a permanent magnet, and wherein the moveable component reduces the magnetic field created by the permanent magnet as a velocity of the shaft is increased.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine comprising:
a rotatable turbomachinery component comprising a plurality of blades;
a surface defining a flow path boundary;
an electrical machine, wherein the electrical machine comprises a stator portion and a rotor portion configured to interact and produce electrical power when the rotor portion is rotated relative to the stator portion, wherein the stator portion comprises conductive coils, wherein the rotor portion of the electrical machine is integrated with the rotatable turbomachinery component, wherein the rotor portion comprises a magnetic field element extending between respective blades of the plurality of blades and located radially inward from the surface defining a flow path boundary, and wherein the conductive coils are located radially outwardly of the flow path boundary such that the flow path boundary protects the conductive coils from a working fluid that flows through the turbomachinery component; and
a magnetic field adjuster, wherein the magnetic field adjuster comprises a moveable member capable of altering a magnetic field that interacts with the conductive coils, wherein the moveable member is urged from a first position to a second position via centripetal acceleration, and wherein the moveable member is configured to move in both a radial and an axial direction along a conical surface of a blade of the plurality of blades to alter the magnetic field as a function of rotational speed of the shaft.

2. The apparatus of claim 1, wherein the gas turbine engine comprises a turbofan engine, wherein the rotatable turbomachinery component comprises a bladed fan.

3. The apparatus of claim 1, wherein the rotor portion forms a bridge between respective blades of the plurality of blades.

4. The apparatus of claim 3, wherein the bridge forms an annular construction around the entirety of the plurality of blades.

5. The apparatus of claim 1, further comprising a voltage adjuster.

6. The apparatus of claim 1, wherein the conductive coils are covered by a material covering.

7. An apparatus comprising:
a gas turbine engine comprising:
a bladed turbomachinery component structured to rotate through an annulus and change a pressure of a working fluid flowing through the annulus;
an electric machine comprising a stator and a rotor structured to rotate relative to the stator at the same speed as the bladed turbomachinery component of the gas turbine engine, wherein the rotor comprises a magnetic field element extending between respective blades of the bladed turbomachinery component, the electric machine having a plurality of windings coupled with a voltage adjuster structured to interconnect the plurality of windings in a plurality of configurations, wherein each configuration of the plurality of configurations is associated with a respective voltage of a plurality of voltages provided by the electric machine, wherein the voltage adjuster includes a selector member configured to connect one or more of the plurality of windings in parallel to create a parallel winding configuration in series with the remaining of the plurality of windings such that the electric machine generates a selected voltage of the plurality of voltages, wherein the rotor is radially inward of a surface forming a flow path boundary of the gas turbine engine; and
a magnetic field adjuster, wherein the magnetic field adjuster comprises a moveable member capable of altering a magnetic field that interacts with the plurality of windings, wherein the moveable member is urged from a first position to a second position via centripetal acceleration, wherein the moveable member is configured to move in both a radial and an axial direction along a conical surface of a blade of the plurality of blades to alter the magnetic field as a function of rotational speed of the shaft.

8. The apparatus of claim 7, wherein the selector member includes a plurality of switches, and wherein the electric machine includes a plurality of coils each having the plurality of windings.

9. The apparatus of claim 7, wherein the electric machine is an electric generator.

10. The apparatus of claim 7, wherein the rotor is disposed at a radially outer end of the bladed turbomachinery component.

11. An apparatus comprising:
a gas turbine engine comprising a shaft drivingly connected to a plurality of blades structured to rotate within a passage and change a total pressure of a working fluid traversing the passage, the gas turbine engine also comprising an electric machine having a first component with coils and a second component including a magnetic field element and having a moveable member capable of altering a magnetic field of the magnetic field element that interacts with the coils of the first component, the shaft configured to rotate the second component relative to the first component at substantially the same rate as the shaft of the gas turbine engine, wherein the moveable member is urged from a first position to a second position via centripetal acceleration, the gas turbine engine further comprising a biasing member configured to provide a force to the moveable member in the second position; and
wherein the second component is configured to allow the moveable member to move in both a radial and an axial direction along a conical surface of a blade of the plurality of blades to alter the magnetic field as a function of rotational speed of the shaft.

12. The apparatus of claim 11, wherein the moveable member is slideable from the first position to the second position.

13. The apparatus of claim 11, wherein the second component is a rotor of the electric machine, the rotor being located radially inward of a surface of the gas turbine engine defining a flow path boundary.

14. The apparatus of claim 11, wherein the moveable member reduces the magnetic field created by the magnetic field element as a velocity of the shaft is increased.

15. The apparatus of claim 11, wherein the coils of the first component are covered by a material covering.

* * * * *